US007823780B2

(12) United States Patent
Walsh et al.

(10) Patent No.: US 7,823,780 B2
(45) Date of Patent: Nov. 2, 2010

(54) DATA INTERFACE ASSEMBLY FOR ELECTRONIC LOCKS AND READERS

(75) Inventors: John E. Walsh, Wallingford, CT (US); Kevin Dean Miller, Farmington, CT (US)

(73) Assignee: Harrow Products LLC, Montvale, NJ (US)

( * ) Notice: Subject to any disclaimer, the term of this patent is extended or adjusted under 35 U.S.C. 154(b) by 576 days.

(21) Appl. No.: 11/640,632

(22) Filed: Dec. 18, 2006

(65) Prior Publication Data

US 2008/0142593 A1 Jun. 19, 2008

(51) Int. Cl.
*G06K 7/06* (2006.01)

(52) U.S. Cl. .................................... 235/441; 70/283.1

(58) Field of Classification Search .................. 235/27, 235/130 R, 441
See application file for complete search history.

(56) References Cited

U.S. PATENT DOCUMENTS

| | | | | |
|---|---|---|---|---|
| 3,382,338 | A | 5/1968 | Arseneault et al. | |
| 3,591,749 | A * | 7/1971 | Comstock | 200/308 |
| 3,699,294 | A | 10/1972 | Sudduth | |
| 3,760,137 | A | 9/1973 | Shimojo et al. | |
| 3,793,614 | A | 2/1974 | Tachick et al. | |
| 3,988,551 | A * | 10/1976 | Larson | 200/5 A |
| 3,995,126 | A * | 11/1976 | Larson | 200/5 A |
| 4,060,703 | A * | 11/1977 | Everett, Jr. | 200/5 A |
| 4,314,117 | A * | 2/1982 | Ditzig | 200/5 A |
| 4,390,758 | A | 6/1983 | Hendrickson | |
| RE31,332 | E | 8/1983 | Larson | |
| 4,527,021 | A | 7/1985 | Morikawa et al. | |
| 4,536,625 | A | 8/1985 | Bebie | |
| 4,555,601 | A * | 11/1985 | Taguchi | 200/5 A |
| 4,609,791 | A | 9/1986 | Abbat | |
| 4,621,373 | A | 11/1986 | Hodsdon | |
| 4,801,771 | A | 1/1989 | Mizuguchi et al. | |
| 4,862,499 | A | 8/1989 | Jekot et al. | |

(Continued)

FOREIGN PATENT DOCUMENTS

| | | |
|---|---|---|
| EP | 0877250 | 11/1998 |

OTHER PUBLICATIONS

PCT/US07/87941 International Search Report and Written Opinion dated Jun. 9, 2008, 10 pages.

*Primary Examiner*—Daniel A Hess
*Assistant Examiner*—Paultep Savusdiphol
(74) *Attorney, Agent, or Firm*—Michael Best & Friedrich LLP

(57) ABSTRACT

An interface assembly is for an electronic device including a base and a control on the base and includes a contact on the base and coupled with the control and a data port spaced from the contact. A conductor is disposed between the data port and the contact such that data is transmissible between the data port and the contact through the conductor. The conductor is generally compressed or/and compressible between the data port and the contact and is formed of a conductive carbon material. The data port is spaced from the contact by a distance within a range of values, and the conductor provides a conductive path between the data port and the contact at each spacing distance value. A fluid impermeable cover is disposed over the base and covers the control and the contact to prevent moisture from contacting these components, with the conductor extending through the cover.

32 Claims, 6 Drawing Sheets

U.S. PATENT DOCUMENTS

| | | | | |
|---|---|---|---|---|
| 4,882,581 | A | 11/1989 | Inobe et al. | |
| 5,351,550 | A | 10/1994 | Maurer | |
| 5,355,701 | A | 10/1994 | Tobias | |
| 5,367,133 | A * | 11/1994 | Schmidt et al. | 200/5 A |
| 5,373,718 | A | 12/1994 | Schwerdt et al. | |
| 5,788,516 | A | 8/1998 | Uggmark | |
| 6,180,900 | B1 | 1/2001 | Horiuchi | |
| 6,217,373 | B1 * | 4/2001 | Johnston | 439/499 |
| 6,652,968 | B1 | 11/2003 | Miller et al. | |
| 6,705,783 | B1 * | 3/2004 | Bowen | 400/472 |
| 6,911,608 | B2 | 6/2005 | Levy | |
| 6,975,470 | B2 | 12/2005 | Walsh et al. | |
| 7,118,393 | B1 | 10/2006 | Pupkiewicz et al. | |
| 7,236,085 | B1 * | 6/2007 | Aronson et al. | 340/5.64 |
| 2002/0056300 | A1 | 5/2002 | Pierre et al. | |
| 2002/0063149 | A1 * | 5/2002 | Jun | 235/145 R |
| 2005/0109602 | A1 | 5/2005 | Parkinson et al. | |
| 2006/0011458 | A1 * | 1/2006 | Purcocks | 200/310 |

* cited by examiner

DATA INTERFACE ASSEMBLY FOR ELECTRONIC LOCKS AND READERS

The present invention relates to electronic locks, and more particularly to data interface assemblies for such electronic locks.

Data interface assemblies, such as input and/or output assemblies for electronic locks or electronic readers, are known. Certain types of data interface assemblies include a data port and a contact on a PCB, and in some of these devices also include a conductor disposed between and electrically coupling the port and the contact. When directly connected with a PCB contact, the ports are typically soldered thereto, which often leads to unreliable soldered joints and risks the integrity of the PCB by mechanical loads transferred from the data port. In other applications, wires, prongs, springs, etc. have been used to connect a data port with the PCB contact spaced therefrom, which eliminates mechanical loading of the contact and direct soldering between port and contact. However, such interface arrangements often experienced malfunctions due to pinched wires and generally required some manner of waterproofing the PCB to prevent moisture damage.

SUMMARY OF THE INVENTION

In one aspect, the present invention is an interface assembly for an electronic device including a base and a control mounted on the base. The interface assembly comprises a contact mounted on the base and coupled with the control, a data port spaced from the contact, and a conductor configured to electrically couple the data port and the contact. The conductor has a body disposed at least partially between the data port and the contact such that data is transmissible between the data port and the contact through the conductor body. The conductor body is either generally compressed between or generally compressible between the data port and the contact.

In another aspect, the present invention is an interface assembly for an electronic device including a base with a mounting surface and a control disposed on the base mounting surface. The interface assembly comprises a contact disposed on the base and coupled with the control a generally fluid impermeable cover disposed at least partially over the base mounting surface so as to generally cover the control and the contact. The cover is configured to generally prevent moisture from contacting the control and the contact. Further, a data port is spaced from the contact such that the cover is disposed generally between the port and the base and at least one conductor extends through the cover. The conductor has a body with a first end disposed against the data port and a second end disposed against the contact such that data is transmissible between the port and the control through the conductor.

In a further aspect, the present invention is an interface assembly for an electronic device including a base member and a control mounted on the base. The interface assembly comprises a contact mounted on the base and coupled with the control and a data port having an outer end configured to receive a key with stored data and an inner end. A conductor has a generally cylindrical body with a first end disposed against the data port inner end and a second end disposed against the contact such that data is transmissible from the port, through the conductor and the contact and to the control. The conductor body has sufficient resistance so as to be configured to snub electrostatic charge.

In yet another aspect, the present invention is an electronic device comprising a base, a control mounted on the base, a contact mounted on the base and coupled with the control, and a data port spaced from the contact. A conductor has a body with a first end disposed against the data port and a second end disposed against the contact such that data is transmissible from the port, through the conductor and the contact and to the control. The conductor body is generally compressed between and/or generally compressible between the data port and the contact.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
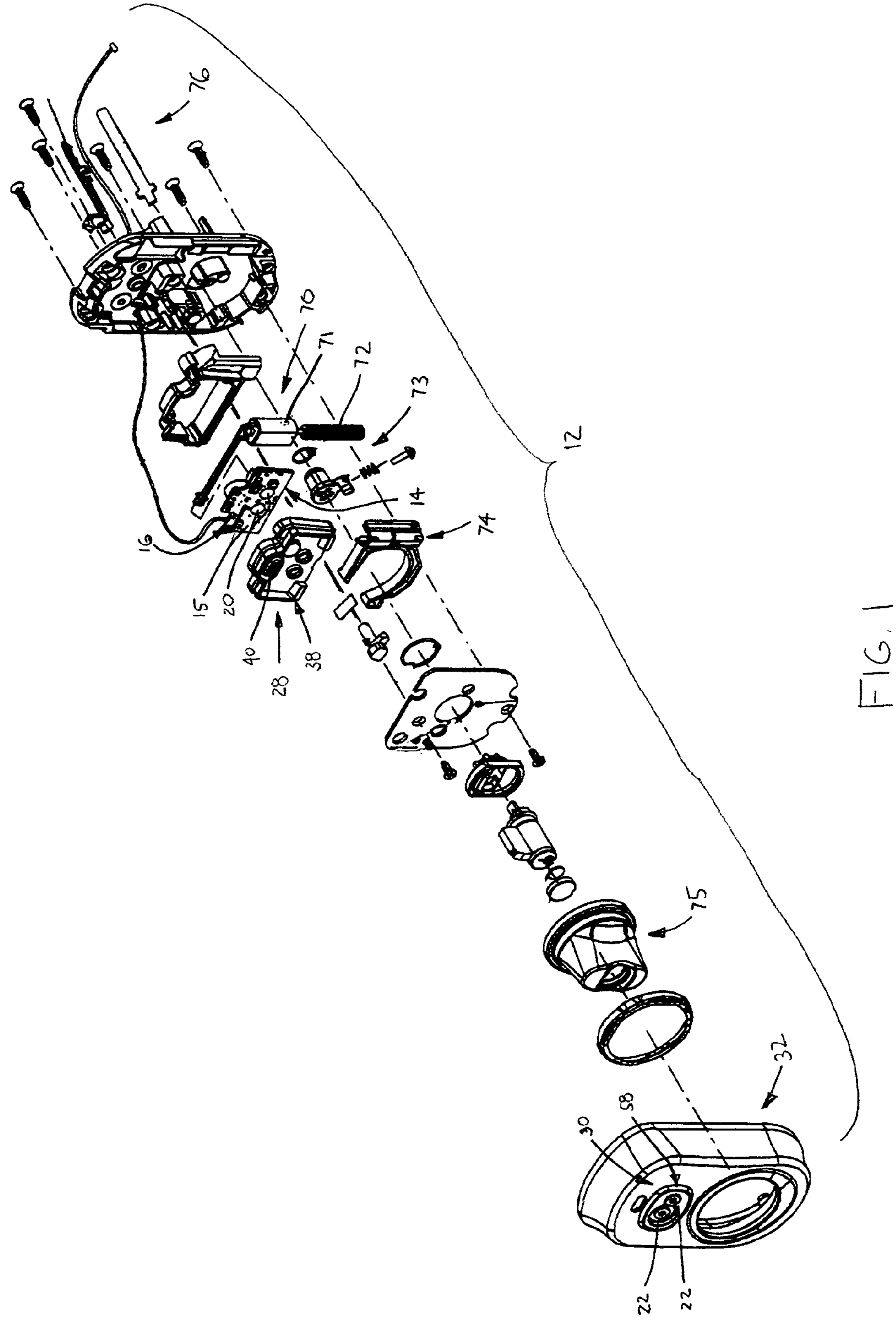
FIG. 1 is an exploded, perspective view of an exemplary electronic lock incorporating a data interface assembly in accordance with the present invention.
Figure 2:
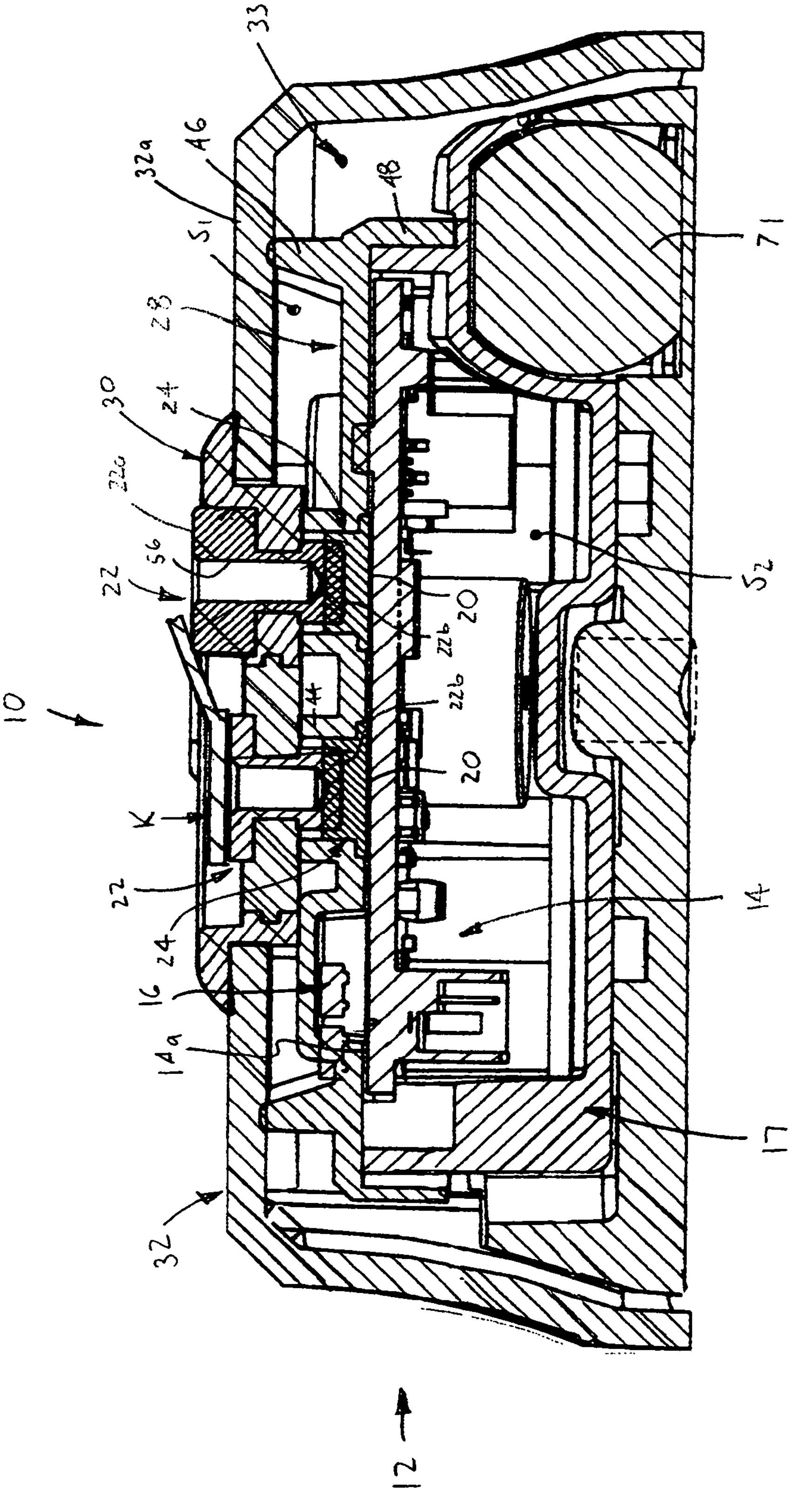
FIG. 2 is a cross-sectional view of the electronic lock and data interface assembly.

Certain terminology is used in the following description for convenience only and is not limiting. The words "right", "left", "lower", "upper", "upward", "down"and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-6 a data interface assembly 10 for an electronic device 12, the device 12 preferably being an electronic lock (as shown) or a data reader (not depicted) and including a base 14 and a control 16 mounted on the base 14, preferably on a base mounting surface 14*a*. The base 14 is preferably a printed circuit board or "PCB" 15 with front and rear mounting surfaces 15*a*, 15*b*, but may be any other appropriate electronic substrate, as discussed below. The data interface assembly 10 basically includes at least one and preferably two contacts 20, most preferably conductive pads, mounted on the base 14 and coupled with the control 16, at least one and preferably two data ports 22 each having an outer end 22*a* configured to receive data from a key K (FIG. 2) with stored data and/or to transmit data to an external data storage device (e.g., of a lock programming or auditing device), and at least one and preferably two conductors 24. Each conductor 24 has a body 26 with a first end 26*a* disposed against the data port inner end 22*b* and a second end 26*b* disposed against the contact 20. As such, the key data $D_K$ is transmissible from the port 22, through the conductor 24 and the contact 20 and to the control 16, as indicated in FIGS. 5A and 5B. The conductor body 26 is either generally compressed between, or at least generally compressible between, the data port 22 and the contact for reasons described below.

Preferably, the conductor 24 is formed of a conductive carbon material and is configured to snub electrostatic discharge proximal to the data port 22, and thus distally from the base 14, as discussed in greater detail below. Further, the interface assembly 10 also preferably comprises a generally fluid impermeable cover 28 disposed at least partially over the base mounting surface 14*a* so as to generally cover the control 16 and the contact 20, with each conductor body 26 being at least partially disposed within the cover 28. The cover 28 is configured to generally prevent moisture or other fluid from contacting the control 16, the contact 20, and any other electrical components on the base 14, as described below. Furthermore, the interface assembly 10 preferably also comprises a support member 30 spaced from the base 14 and configured to retain the data port(s) 22 spaced from the associated contact(s) 20, each data port 22 being either molded to or connected with the support member 30 as discussed in further detail below. Also, the electronic device 12 preferably further includes a housing or escutcheon 32 having a front end 32*a* and an interior chamber 33, the various components of the preferred lock assembly being disposed within, attached to, or otherwise connected with the housing 32. Specifically, the base 14 is coupled with the housing 32 such that the control 16 and the contact 20 are generally disposed within the housing interior chamber 33, and the data ports 22 are connected with the housing front end 32*a*, preferably by means of the support member 30 being connected with the housing 32 so as to be spaced from the base 14.

Figures 5A, 5B:
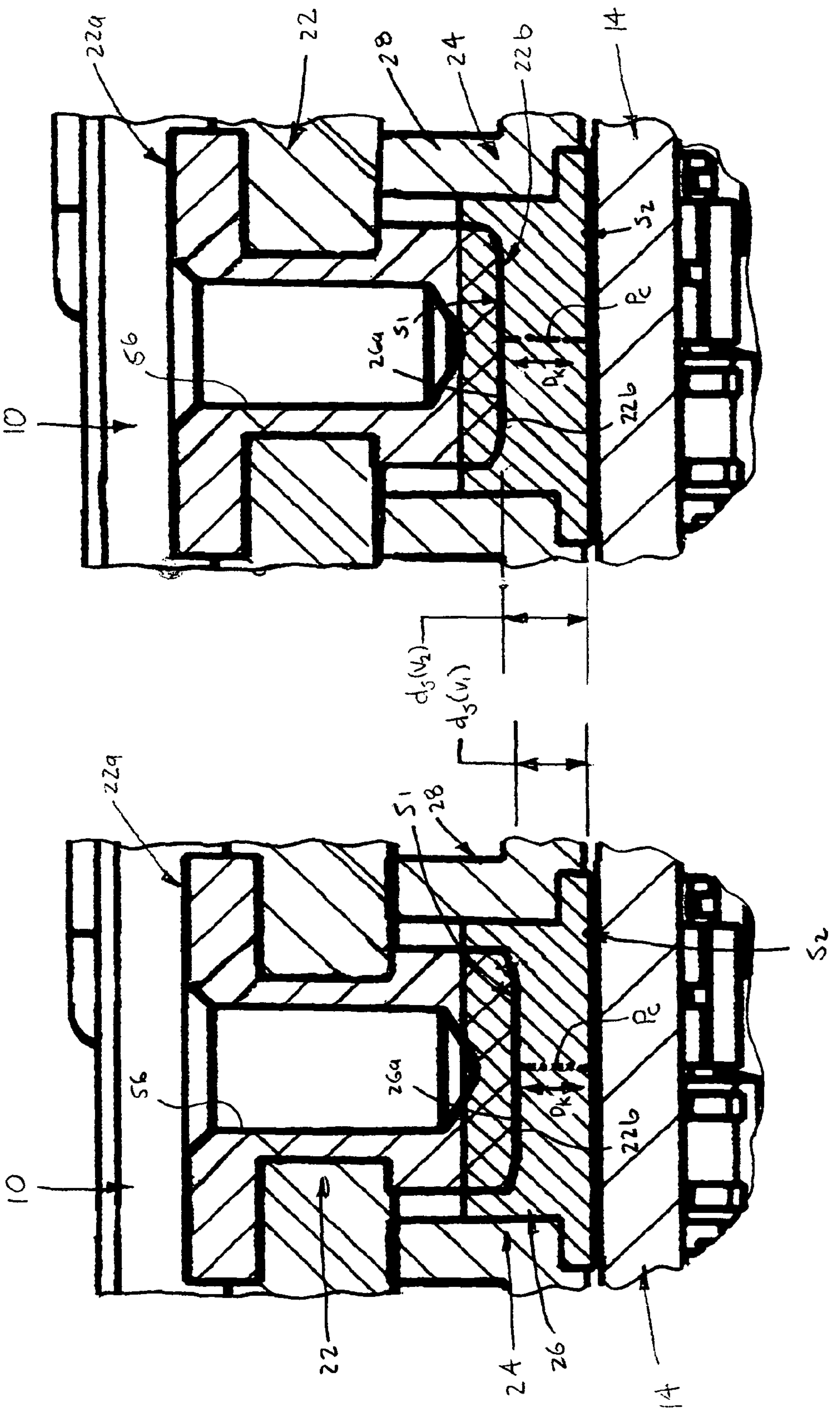
FIGS. 5A and 5B are each a greatly enlarged, axial cross-sectional view of a contact, a conductor and a data port of a data interface assembly, each showing a different value of a spacing distance between the contact and data port.

Referring particularly to FIGS. 5A and 5B, the data port 22 is spaced from the contact 20 by a distance $d_S$, which is preferably established by the spacing between the support member 30 and the base 14. The spacing distance $d_S$ has a value $v_n$ (e.g., $v_1$, $v_2$, etc.) within a range of values; in other words, the actual value of the spacing distance $d_s$between the data port 22 and the contact 20 in a specific interface assembly 10, as compared with other data assemblies 10 (e.g., in a production run), may vary due to the tolerance "stackup" of the various parts that the form the interface assembly and the electric device 12, as described in more detail below. Therefore, with the preferred conductor body 26, the conductor 24 is configured to provide a conductive path $P_C$ between the data port 22 and the contact 20 at each one of the various spacing distance values $v_n$. That is, the preferred compressible conductor body 26 is compressed to a greater or lesser extent as necessary to accommodate differences in the spacing distance $d_S$, such that each one of a plurality of data assemblies 10 will function correctly even though the spacing distance $d_S$ of the assemblies 10 varies within the range of values. For example, FIG. 5A depicts one interface assembly 10 with a first, lesser spacing distance value $v_1$ and FIG. 5B depicts another interface assembly 10 with a second, greater spacing distance value $v_2$. With both interface assemblies 10, the body 26 of each conductor 24 compresses as required to provide the conductive path $P_C$ between the data ports 22 and the associated contacts 20.

Figure 3:
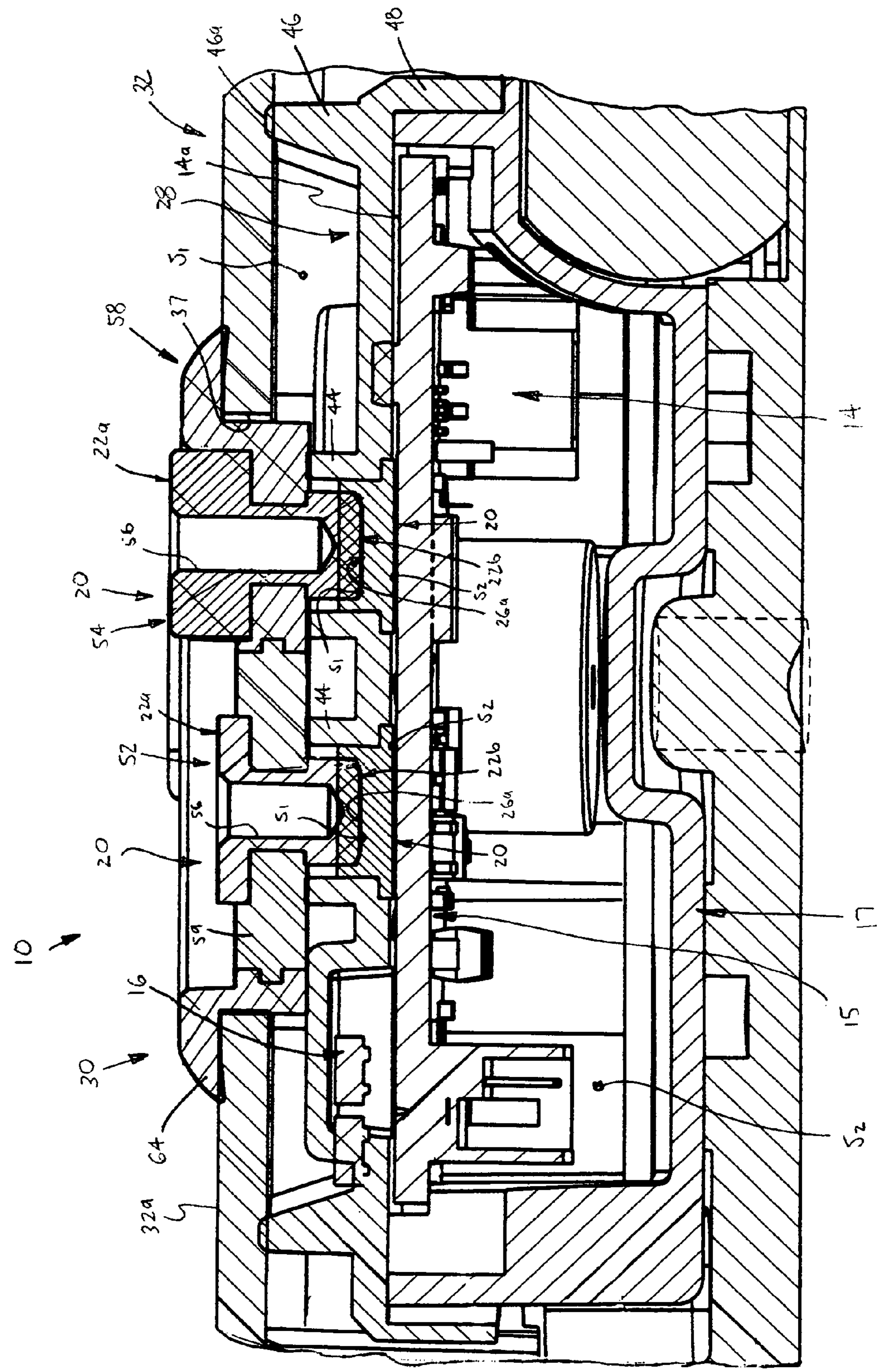
FIG. 3 is an enlarged, cross-sectional view of a central portion of the data interface assembly shown in FIG. 2.

As indicated in FIGS. 3, 5A and 5B, a further benefit of having a compressible body 26 is that the conductor 24 is configured to form a first, generally fluid impermeable seal $S_1$ between the body first end 26*a*and the data port 22 and a second, generally fluid impermeable seal $S_2$ between the body second end 26*b* and the contact 20. In other words, the compression of the body 26 forces the body ends 26*a*, 26*b* tightly against the associated data port 22 and contact 20, respectively, which substantially prevents any fluid from entering therebetween. Therefore, not only are there reliable electrical contacts between the conductor 18 and both the data port 22 and the contact 20, but these electric contacts are substantially isolated from moisture by the seals $S_1$, $S_2$ formed by conductor body compression.

Figure 4:
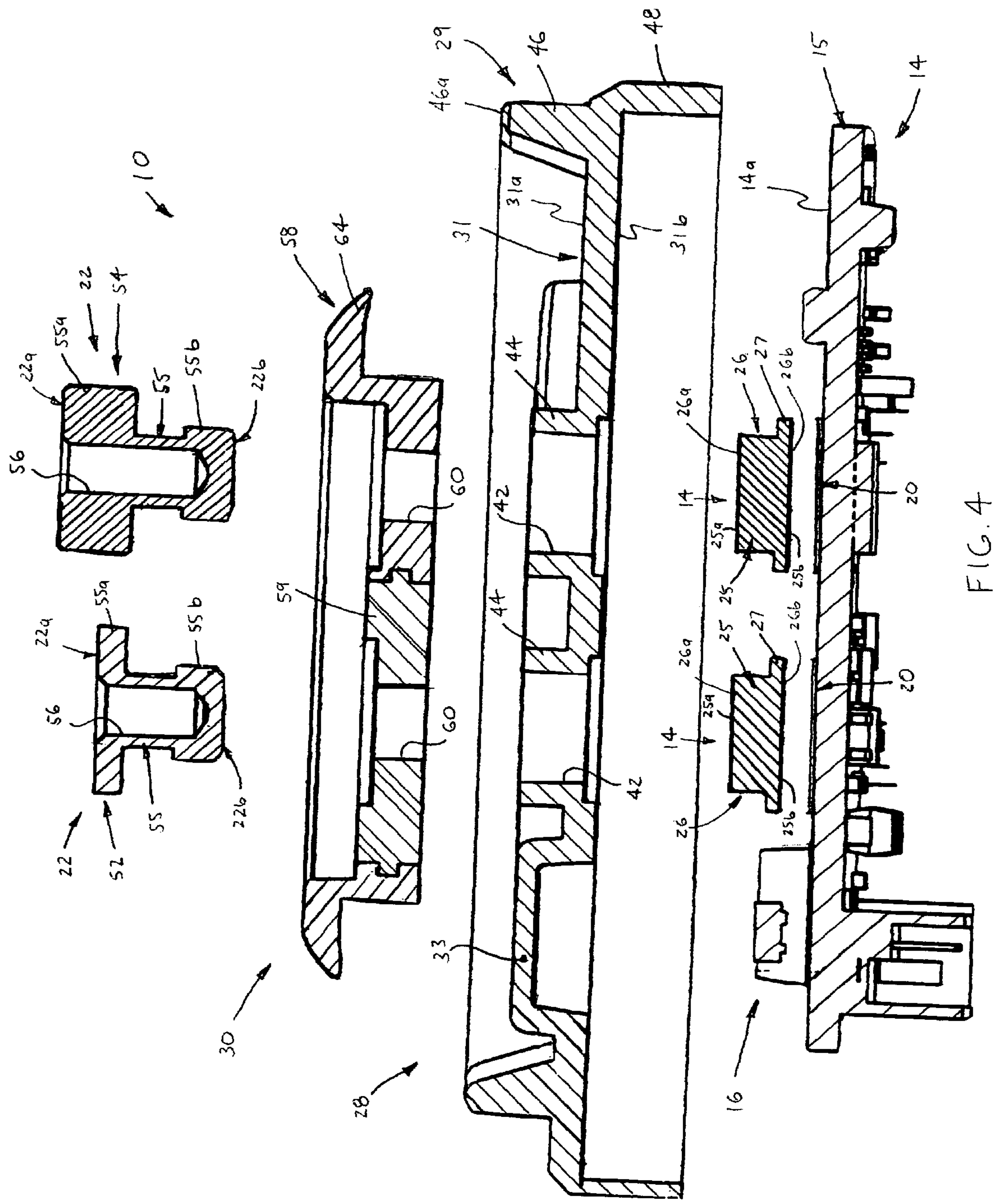
FIG. 4 is an exploded, cross-sectional view of several components of the data interface assembly depicted in FIG. 3.

As best shown in FIG. 4, the conductor body 26 is preferably formed as a generally circular cylinder 25 (i.e., a cylinder with circular axial cross-sections) with a radially-extending ledge or lip 27 and arranged such that the conductor first and second body ends 26*a*, 26*b* are provided by the axial ends 25*a*, 25*b* of the cylinder 25. Alternatively, the conductor body 26 may be formed of a plurality of conductive of strands or strips, commonly referred to in the art as "zebra stripes", as a generally pill-shaped body, as a generally tubular body, or as any other appropriate shape (no alternatives shown).

Regardless of the specific body shape, the conductor 24 is preferably formed of a combination or mixture of a conductive material and an elastic material so as to be conductive, compressible, and to have a degree of internal resistance, as discussed above. Most preferably, the conductor body 26 is formed of finely milled carbon particles or powder mixed/milled in a raw silicone base material, the carbon powder being in a sufficient amount or "concentration" so that after vulcanization or extrusion of the mixture, the body 26 is substantially conductive. The concentration/amount of the carbon powder in the mixture is determined by the desired resistance of the finished conductor 24; specifically, more carbon powder is used when the desired resistance of the conductor 24 is lesser, and vice-versa. Such a material mixture is commercially referred to as "carbon impregnated silicone". However, the conductor body 24 may be formed of one or more other types of elastic materials, such as EPDM, natural rubber, etc., and/or of other types of conductive material such as copper, silver, etc, and the scope of the present invention embraces these and all other appropriate materials for forming the conductor 24 so as to function generally as described herein.

In any case, being formed of a material that provides at least a degree of resistance (i.e., carbon), any static electric charge accumulating at the data port 22 is "snubbed" within the conductor body 26, preferably generally proximal to the data port 22. As such, electrostatic charge is prevented from increasing or "spiking" the amplitude of any signals (i.e., key data) passing through the conductor 24 to the associated contact 20, which could potentially damage any electronic components configured to operate within a specified voltage range. Such damage may occur with a conductor formed of relatively highly conductive (i.e., low resistance) material, such as copper, steel, etc.

Referring now to FIGS. 1-4, the cover 28 has a generally rectangular body 29 with a generally thin, generally plate-like central portion 31 with front and rear surfaces 31*a*, 31*b*, the rear surface 31*b* being disposed generally against or upon the base 14, and is preferably formed of at least one sheet 33 of an elastomeric material. The elastomeric material sheet 33 may be natural or synthetic rubber, and is most preferably silicone rubber. With such a cover 28, the two preferred conductors 24 are each preferably insert molded within the elastomeric sheet(s) 33, but may be coupled with the cover 28 by any other appropriate technique. Preferably, the cover 28 is provided by a portion of a flexible "keypad" that includes, and also preferably functions to bias, one or more input members 40 (FIG. 1) such as a pushbutton(s), input key(s), etc., and/or includes lights or other output members (none shown). Alternatively, the cover 28 may be formed or constructed so as to function solely or primarily to protect the electronic components on the base 14 (not shown).

Referring to FIGS. 3 and 4, the cover 28 preferably has at least one and preferably a plurality of through holes 42 each configured to receive a separate conductor 24. Preferably, the conductor 24 is molded within the cover 28, most preferably insert molded therewithin. The cover 28 also preferably has one or more circular mounting flanges 44 extending outwardly from a front surface 31*a* of the cover central portion 31, each flange 44 being formed to fit tightly about at least a portion of one conductor body 26 (i.e., insert molded about). Further, the cover 28 also preferably has a sealing flange 46 extending outwardly from the cover body front surface 31*a* and having an outer end 46*a* disposeable against an inner surface 32*a* of the housing/escutcheon 32. As such, the sealing flange 46 functions to substantially prevent moisture or other fluid from entering the space $S_1$ between the support member 30 and the base 14. Furthermore, the cover 28 also preferably includes a mounting and sealing flange 48 extending outwardly from the cover body rear surface 31*b* disposeable about an outer edge of a base holder 17, as discussed below. The mounting and sealing flange 48 is configured to couple the cover 28 with the base 14 and to prevent moisture/fluid from entering the space $S_2$ between the base 14 and the base holder 17, and thereby contacting electrical components on the base rear surface 15*b*, as best shown in FIG. 3.

Referring again to FIGS. 1-6, the data ports 22 are preferably configured or arranged such that one port 22 is a data reader port 52 and the other port 22 is a ground port 54. Preferably, the ports 52, 54 are configured to operate as an ibutton input port (see FIG. 2) and to alternatively each receive a separate prong (e.g., a "banana clip") of a data reader or programming device (not shown). With such a structure, the reader port 52 is configured to transmit and/or receive data from the prongs to and/or from the conductor 24, and thereafter to the control 16 or a programming/data storage device. The ground port 54 is provided to close a circuit including the ibutton K or reader/programmer and the control 16. Referring particularly to FIG. 4, each data port 22 preferably includes a body 55 with an outer, radially larger circular cylindrical portion 55*a* and an inner, radially smaller circular cylindrical portion 55*b*, and a data port opening 56 sized to receive a prong, as discussed above. Further, the two ports 52, 54 are preferably constructed such that the radially larger portion 55*a* of the ground port 54 has a greater axial extent than the corresponding section of the reader port 52. As such, an ibutton key K contacting the reader port 52 will have a portion that contacts the ground port 54 as required. However, the one or more data ports 22 may be constructed in any other appropriate manner and the scope of the present invention is in no manner limited by the structure or operation of the data port(s) 22.

Figure 6:
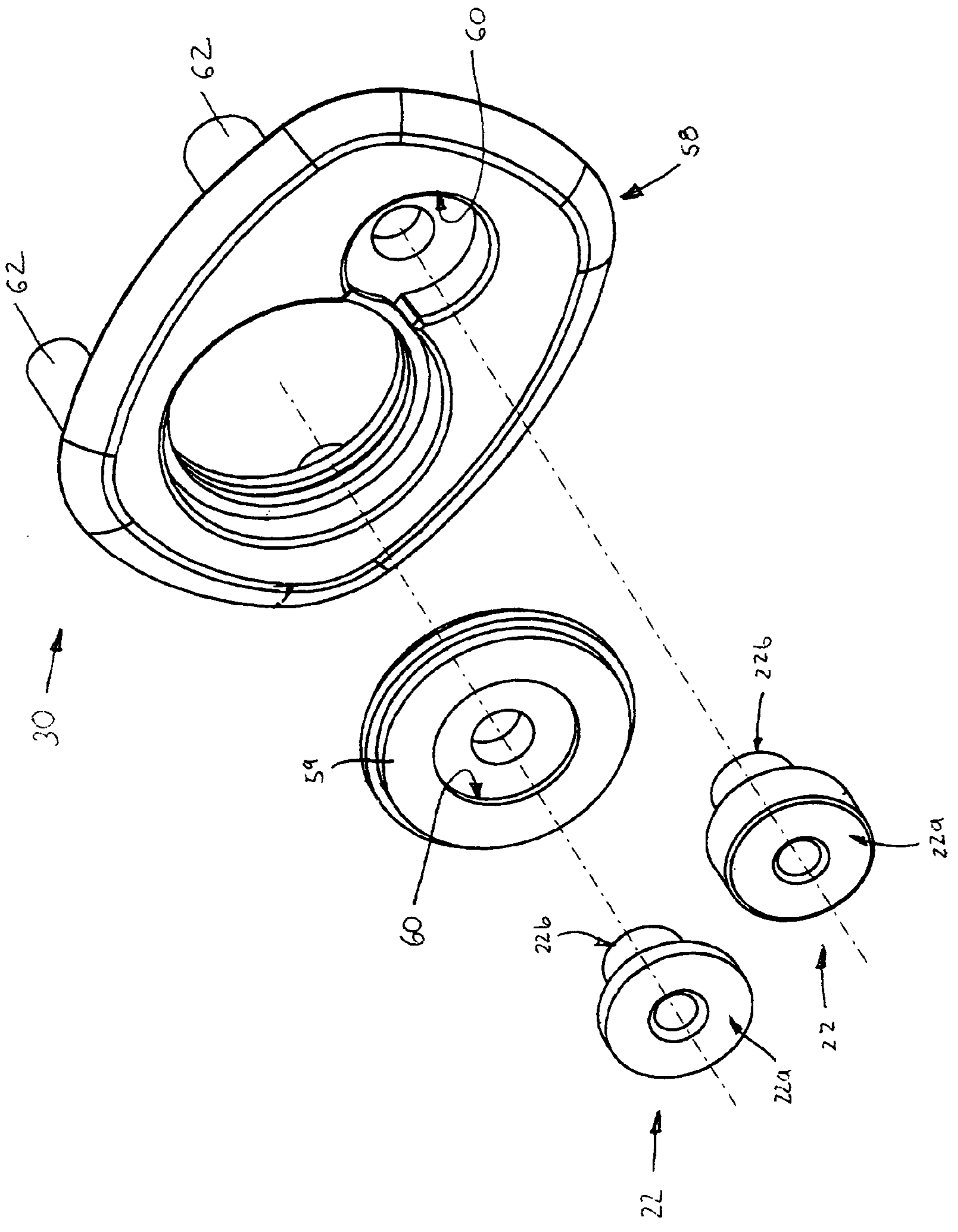
FIG. 6 is an exploded view of a preferred data port assembly of the data interface assembly.

Referring now to FIGS. 1, 3, 4 and 6, the support member 30 preferably includes a generally rectangular, generally disk-like body 58 connectable with the housing 32, most preferably frictionally retained within an opening 37 of the housing 32. The support member body 58 preferably has two generally circular, stepped or counter-bored mounting holes 60 each configured to receive and frictionally retain a separate data port 22, as described below. Most preferably, the support member body 58 includes a circular insert 59 providing the mounting hole 60 for the data port 52, as best shown in FIG. 6, but the data reader hole 60 may alternatively be formed in the main portion of the body 58. Further, the support body 58 preferably includes a plurality of mounting posts 62, preferably four (only two shown), each disposeable within a separate mounting hole section (not shown) of the housing opening 37, and a outer ledge or lip 64 disposeable against the housing outer surface 32*a*, as indicated in FIG. 4. Preferably, the support member 30 is formed of plastic, but may be fabricated of any appropriate material. Although the support member 30 is preferably constructed as described above, the support member 30 may be formed in any other appropriate manner.

Referring now to FIGS. 1-4, as discussed above, the base 14 is preferably a PCB 15, onto which are mounted various electronic components used to operate the preferred lock assembly 12. However, the base 14 may alternatively be any appropriate electronic substrate formed of any appropriate material such as fiber glass, glass, flex circuit, etc., or any other electronic assembly means capable of electrically connecting various electronic components.

Referring particularly to FIG. 1, the preferred lock assembly 12 preferably includes an electronic actuator 70, preferably a motor 71 and spring shaft 72, operably coupled with the control 16 and configured to displace a coupling device 73, such as a component of a clutch mechanism 74, configured to connect a handle 75 with a retractor device 76. Alternatively, the actuator 70 may displace a blocking device (not shown) configured to releasably retain the handle 75, the retractor 76, or an intermediate connected component (not indicated). In either case, the control 16 is configured to receive input data from one or both data ports 22, to compare the input data with stored data (e.g., authorized user codes, etc.), and to generate and transmit a control signal to the actuator 70. The control 16 is preferably also configured to interface with and transmit stored data records to a data reader, for example to provide audit information concerning lock usage, and to receive programming instructions or new lock codes. However, the data interface assembly 10 of the present invention may be configured for use with any appropriate electronic device 12, such as for example a credential reader for access control systems, a generic data terminal (e.g., for ATM machines, a "watchman" station), etc.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined in the appended claims.

We claim:

1. An interface assembly for an electronic device, the device including a base and a control mounted on the base, the interface assembly comprising:

a plurality of contacts mounted on the base and coupled with the control;

a plurality of data ports spaced from the plurality of contacts;

a cover having a plurality of apertures spaced apart from each other, the cover disposed at least partially over the base and configured to generally prevent moisture from contacting the control and the plurality of contacts; and a plurality of conductors each having a body at least partially disposed in one of the plurality of apertures and disposed at least partially between one of the plurality of data ports and one of the plurality of contacts such that data is transmissible between the one of the plurality of data ports and the one of the plurality of contacts through each of the conductor bodies, each conductor body being at least one of generally compressed between and generally compressible between the one of the plurality of data ports and the one of the plurality of contacts.

2. The interface assembly as recited in claim 1 wherein:

each contact has a conductive surface;

each data port has an outer end and an opposing inner end, the outer end being configured to electrically couple with one of a key with stored data and a data device; and each conductor body has a first end disposed against one of the data port inner ends and a second end disposed against a corresponding one of the contact conductive surfaces.

3. The interface assembly as recited in claim 1 wherein each data port is spaced from one of the corresponding contacts by a distance, the spacing distance having a value within a range of values, and one of the plurality of conductors is configured to provide a conductive path between one of the plurality of data ports and a corresponding one of the plurality of contacts at each spacing distance value.

4. The interface assembly as recited in claim 1 wherein each conductor body includes a mixture of a conductive material and an elastic material.

5. The interface assembly as recited in claim 4 wherein the conductive material includes carbon and the elastic material includes an elastomeric material.

6. The interface assembly as recited in claim 1 wherein each conductor is configured to snub electrostatic discharge at least proximal to one of the plurality of data ports.

7. The interface assembly as recited in claim 1 wherein each conductor body is configured to form a first, generally fluid impermeable seal between the body first end and one of the plurality of data ports and a second, generally fluid impermeable seal between the body second end and a corresponding one of the plurality of contacts.

8. The interface assembly as recited in claim 1 wherein the cover includes a sheet of elastomeric material.

9. The interface assembly as recited in claim 1 wherein the cover is provided by a flexible keypad, the keypad further including at least one key input member coupleable with the control.

10. The interface assembly as recited in claim 1 wherein each of the plurality of conductors is molded within the cover.

11. The interface assembly as recited in claim 1 further comprising a support member spaced from the base member and configured to retain the plurality of data ports spaced from the plurality of contacts.

12. The interface assembly as recited in claim 11 wherein each of the plurality of data ports is at least one of molded to and connected with the support member.

13. The interface assembly as recited in claim 12 further comprising a housing having an interior chamber, the base being coupled with the housing such that the control and the plurality of contacts are generally disposed within the housing interior chamber, the support being connected with the housing so as to be spaced from the base.

14. The interface assembly as recited in claim 1 further comprising a housing having an outer end and an interior chamber, the base being coupled with the housing such that the control and the plurality of contacts are disposed within the interior chamber, the plurality of data ports being connected with the housing outer end.

15. The interface assembly as recited in claim 1 wherein the interface assembly is incorporated into one of a lock escutcheon assembly and a data reader terminal.

16. An interface assembly for an electronic device, the device including a base with a mounting surface and a control disposed on the base mounting surface, the interface assembly comprising:

a plurality of contacts disposed on the base and coupled with the control;

a generally fluid impermeable cover disposed at least partially over the base mounting surface so as to generally cover the control and the plurality of contacts, the cover being configured to generally prevent moisture from contacting the control and the plurality of contacts;

a plurality of data ports spaced from the plurality of contacts such that the cover is disposed generally between the plurality of data ports and the base; and a plurality of conductors extending through the cover and each having a body with a first end disposed against one of the plurality of data ports and a second end disposed against one of the plurality of contacts such that data is transmissible between each data port of the plurality of data ports and a corresponding one of the plurality of contacts through one of the plurality of conductors.

17. The interface assembly as recited in claim 16 wherein each conductor body is at least partially disposed within the cover.

18. The interface assembly as recited in claim 16 wherein the cover includes a sheet of elastomeric material.

19. The interface assembly as recited in claim 16 wherein the cover is provided by a flexible keypad, the keypad further including at least one key input member coupleable with the control.

20. The interface assembly as recited in claim 16 wherein each conductor body is at least one of generally compressed between and generally compressible between one of the plurality of data ports and a corresponding one of the plurality of contacts.

21. The interface assembly as recited in claim 20 wherein each data port of the plurality of data ports is spaced from a corresponding one of the plurality of contacts by a distance, each spacing distance having a value within a range of values, and each conductor of the plurality of conductors is configured to provide a conductive path between one of the plurality of data ports and a corresponding one of the plurality of contacts at each spacing distance value.

22. The interface assembly as recited in claim 16 wherein each conductor body is formed of a mixture of a conductive material and an elastomeric material.

23. The interface assembly as recited in claim 16 wherein each conductor includes one of a conductive cylinder, a zebra strip and a conductive pill.

24. The interface assembly as recited in claim 16 wherein each conductor is configured to snub electrostatic discharge at least proximal to one of the plurality of data ports.

25. The interface assembly as recited in claim 16 wherein each conductor body is configured to form a first, generally fluid impermeable seal between the body first end and one of the plurality of data ports and a second, generally fluid impermeable seal between the body second end and a corresponding one of the plurality of contacts.

26. The interface assembly as recited in claim 16 further comprising a support member spaced from the base member and configured to retain the plurality of data ports spaced from the plurality of contacts, each data port being at least one of molded to and connected with the support member.

27. The interface assembly as recited in claim 16 further comprising a housing having an outer end and an interior chamber, the base being coupled with the housing such that the control and the plurality of contacts are disposed within the interior chamber, the plurality of data ports being connected with the housing outer end.

28. The interface assembly as recited in claim 16 wherein the base includes an electronic substrate having at least one of a printed circuit board, glass, fiberglass, flex circuit.

29. An interface assembly for an electronic device, the device including a base member and a control mounted on the base, the interface assembly comprising:

a plurality of contacts mounted on the base and coupled with the control;

a cover disposed at least partially over the base member and sealingly coupled to the base member to generally prevent moisture from contacting the control and the plurality of contacts, the cover including a plurality of apertures;

a plurality of data ports each having an outer end configured to receive a key with stored data and an inner end; and a plurality of conductors each having a generally cylindrical body disposed in one of the plurality of apertures with a first end disposed against one of the data port inner ends and a second end disposed against one of the contacts such that key data is transmissible from each of the plurality of data ports, through a corresponding one of the plurality of conductors and a corresponding one of the plurality of contacts and to the control, each of the conductor bodies having sufficient resistance so as to be configured to snub electrostatic charge.

30. The interface assembly as recited in claim 29 wherein each conductor body is formed of a mixture of a conductive material and an elastic material.

31. An electronic device comprising:

a base;

a control mounted on the base;

a plurality of contacts mounted on the base and coupled with the control;

a cover having a plurality of apertures spaced apart from each other, the cover sealingly coupled to the base to generally prevent moisture from contacting the control and the plurality of contacts;

a plurality of data ports spaced from the plurality of contacts; and a plurality of conductors disposed in the plurality of apertures, each conductor having a body with a first end disposed against one of the plurality of data ports and a second end disposed against one of the plurality of contacts such that data is transmissible from one of the data ports, through a corresponding one of the conductors and a corresponding one of the contacts and to the control, the conductor body being at least one of generally compressed between and generally compressible between the data port and the contact.

32. The electric device as recited in claim 31 wherein each base includes an electronic substrate with at least one of a printed circuit board, glass, fiberglass, and flex circuit.

* * * * *